United States Patent [19]
Luong

[11] Patent Number: 5,901,361
[45] Date of Patent: May 4, 1999

[54] MOBILE COMMUNICATIONS APPARATUS UPLINK MESSAGE TRANSMISSION OF BATTERY OUTPUT LEVEL INFORMATION

[75] Inventor: Albert Q. V. Luong, Montreal, Canada

[73] Assignee: Telefonaktiebolaget L M Ericsson Publ, Sweden

[21] Appl. No.: 09/128,033

[22] Filed: Aug. 3, 1998

Related U.S. Application Data

[62] Division of application No. 08/764,688, Dec. 11, 1996.

[51] Int. Cl.⁶ .................................................. H04B 1/00
[52] U.S. Cl. ..................... 455/517; 455/67.1; 455/572; 455/575; 455/127; 455/343
[58] Field of Search ................................. 455/572, 574, 455/575, 67.1, 68, 69, 70, 127, 343, FOR 121, 422, 423–425, 383–384, 517, 528, 67.4, 436, 566

[56] References Cited

U.S. PATENT DOCUMENTS

| | | |
|---|---|---|
| 4,679,244 | 7/1987 | Kawasaki et al. . |
| 4,736,461 | 4/1988 | Kawasaki et al. . |
| 4,761,824 | 8/1988 | Saito . |
| 5,142,563 | 8/1992 | Nyuu et al. . |
| 5,497,507 | 3/1996 | Komaki . |
| 5,559,527 | 9/1996 | Quinn ..................................... 455/67.7 |
| 5,590,177 | 12/1996 | Vilmur et al. .......................... 455/436 |
| 5,603,095 | 2/1997 | Uola ........................................ 455/67.1 |

FOREIGN PATENT DOCUMENTS

| | | |
|---|---|---|
| 2-65415 | 3/1990 | Japan ..................................... 455/343 |
| 3-238933 | 10/1991 | Japan . |
| 6-164480 | 6/1994 | Japan ..................................... 455/343 |
| WO 95/09512 | 4/1995 | WIPO . |

*Primary Examiner*—Doris H. To
*Attorney, Agent, or Firm*—Jenkens & Gilchrist, P.C.

[57] ABSTRACT

A mobile communications apparatus monitors the power level of its internal battery power supply, and reports the measured power information on a periodic basis to a serving network. These reports are preferably made during the course of an ongoing call communications utilizing an uplink communications channel. The reported power information is stored by the network. In response to a subsequent detection of an instance of a call drop with respect to that mobile communications apparatus, the stored reported power information is retrieved and processed to determine whether failure of the battery for the mobile communications apparatus is a likely cause of the call drop. If such is the determination, that fact is noted in association with recording the instance of the call drop as the drop cause.

6 Claims, 3 Drawing Sheets

MOBILE COMMUNICATIONS APPARATUS UPLINK MESSAGE TRANSMISSION OF BATTERY OUTPUT LEVEL INFORMATION

This application is a division of application No. 08/764,688, filed Dec. 11, 1996 pending.

BACKGROUND OF THE INVENTION

Technical Field of the Invention

The present invention relates to a battery powered mobile communications apparatus and, in particular, to the monitoring of mobile communications apparatus measured battery output levels for the purpose of identifying battery power failure as the cause of a communications call drop.

Description of Related Art

Within a cellular communications network, dropped subscriber calls are an infrequent but still undesirable occurrence to be avoided if at all possible. Dropped calls may be caused by many factors such as poor signal/noise ratios, interference, poor handoff, and cellular telephone battery failure. Instances of dropped cellular telephone calls are monitored and recorded by the serving cellular network switch. Unfortunately, in many cases, and especially in connection with battery power failure, the cause of the dropped call cannot be identified.

In some instances, the service provider financially penalizes the seller of the network infrastructure (switches, base stations, etc.) for instances of dropped calls because these drops adversely affect service provider revenue generation from network use. In those cases where the drop is caused by circumstances to some degree under the control of the infrastructure seller (for example, poor cell planning), the penalty may be warranted. When the cause of the call drop is not, however, the result of the actions or omissions of the infrastructure seller (for example, battery power failure in the mobile station), the imposition of the penalty is unfair.

There would be an advantage then if not only the existence of a call drop but also its cause were logged for information sake as well as for review in connection with the imposition of penalties on network infrastructure sellers. In particular, there is a need to identify and note instances where mobile station battery power level failure causes a call drop.

SUMMARY OF THE INVENTION

To address the foregoing need, a mobile communications apparatus monitors the power level of its internal battery power supply. The measured power levels are then reported to and stored by the base station or switching node of a serving network. If an ongoing call should then be dropped, the stored power levels reported by the mobile communications apparatus engaged in the dropped call are retrieved. Processing of the retrieved reported power levels is then made to determine whether failure of the battery for the mobile communications apparatus is a likely cause of the call drop. If such is the determination, an appropriate cause notation is made in association with recording the instance of the call drop.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
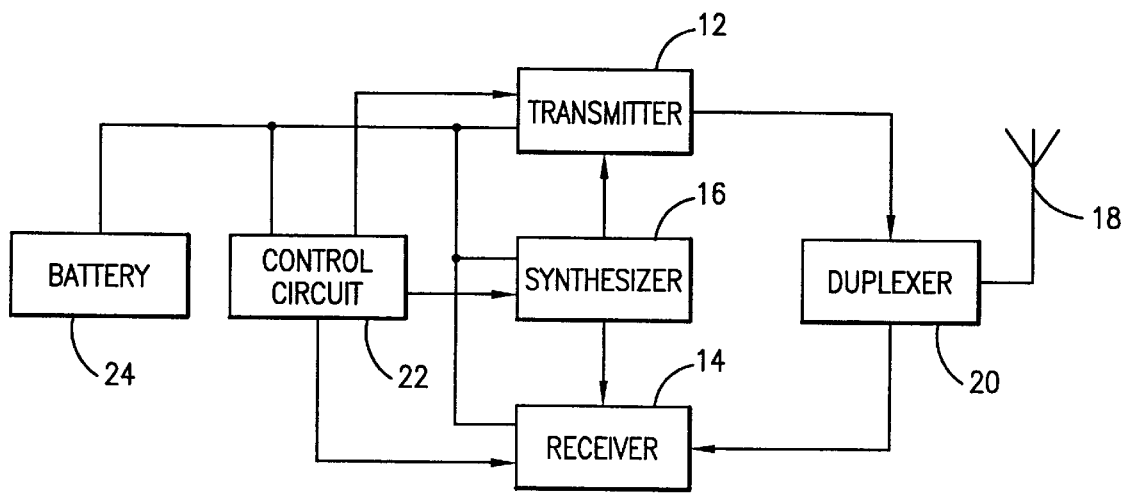
FIG. 1 is a block diagram of a battery powered mobile communications apparatus.

Reference is now made to FIG. 1 wherein there is shown a block diagram of a battery powered mobile communications apparatus 10. The apparatus 10 includes a transmitter 12 and a receiver 14. A frequency synthesizer 16 supplies a local oscillation signal to the transmitter 12 and receiver 14, which are coupled to an antenna 18 through a duplexer 20. The control over the operation of the transmitter 12 and receiver 14, as well as the selection of the local oscillation signal output by the frequency synthesizer 16, is provided by a control circuit 22. A rechargeable battery 24 supplies operating power to transmitter 12, receiver 14, frequency synthesizer 16, and control circuit 22.

Figure 2:
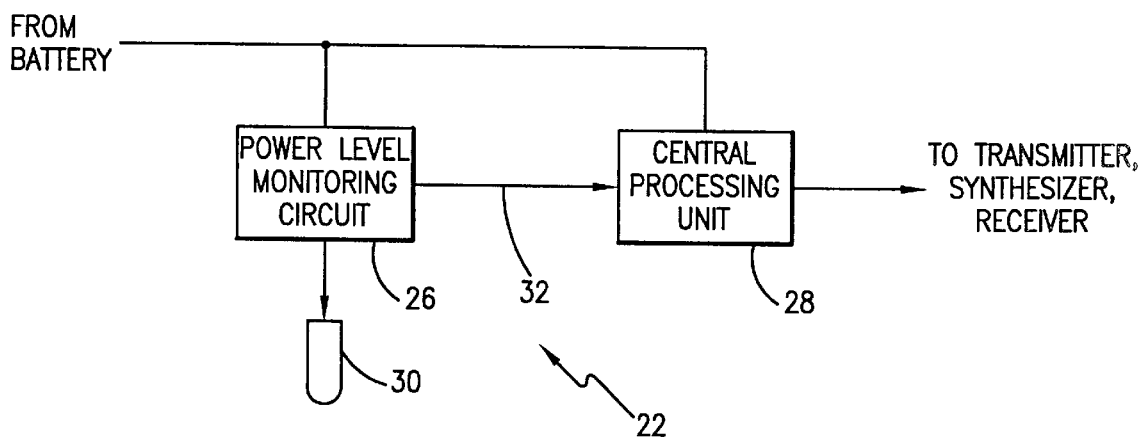
FIG. 2 is a block diagram of a portion of a control circuit for the battery powered mobile communications apparatus of FIG. 1.

Reference is now made to FIG. 2 wherein there is shown a block diagram of a portion of the control circuit 22 for the battery powered mobile communications apparatus 10 of FIG. 1. The control circuit 22 includes a battery power level monitoring circuit 26 connected to receive the supplied operating power output from the rechargeable battery 24. The battery power level monitoring circuit 26 measures the output power level and processes the measured power level to identify the current charge state of the rechargeable battery 24. The control circuit 22 further includes a central processing unit 28 which controls the operation of the transmitter 12 and receiver 14, as well as the selection of the local oscillation signal output by the frequency synthesizer 16.

The current charge state of the rechargeable battery 24 as determined by the battery power level monitoring circuit 26 is visually reported to a user of the mobile communications apparatus 10 through a visual indicator 30 comprising, for example, a light emitting diode (LED) which flashes under control of the monitoring circuit 24 when the measured power level falls below a given threshold. Furthermore, a signal indicative of the current charge state (and in particular the battery power level) of the rechargeable battery 24 is output by the battery power level monitoring circuit 26 on line 32 to the central processing unit 28. During the course of an ongoing call, and further on a periodic basis with respect thereto, the central processing unit 28 controls the operation of the transmitter 12 to send on a communications uplink information relating to the measured power level of the rechargeable battery 24.

Figure 3:
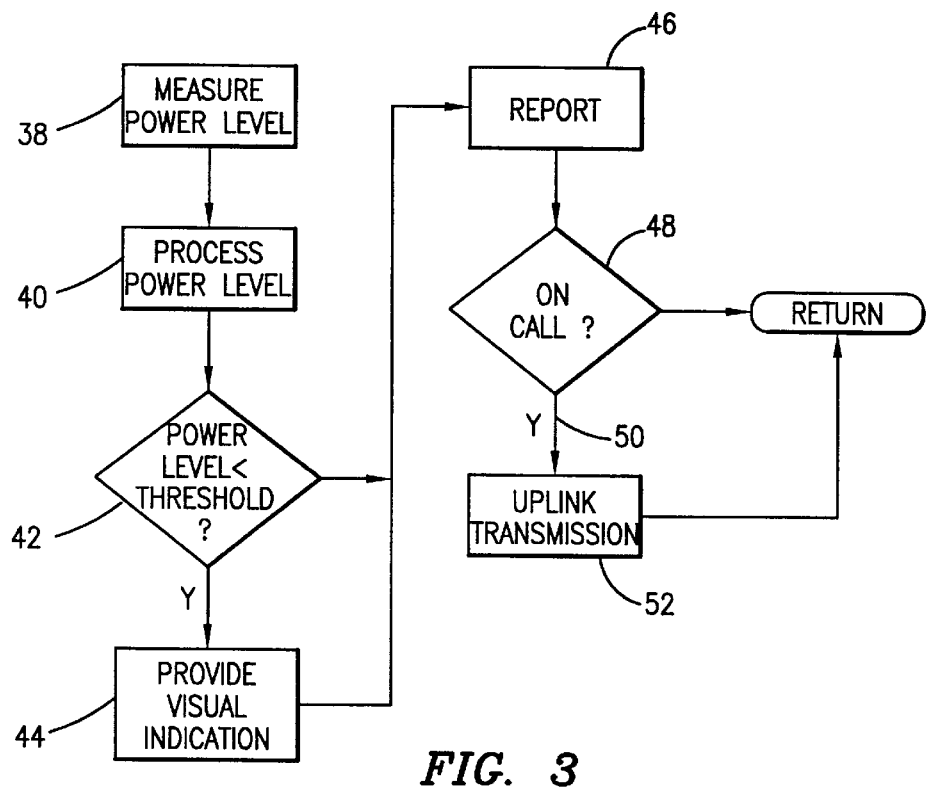
FIG. 3 is a flow diagram illustrating the operation of the battery powered mobile communications apparatus of FIG. 1 in monitoring battery power levels and reporting the monitored levels on a communications uplink.

Reference is now additionally made to FIG. 3 wherein there is shown a flow diagram illustrating the operation of the battery powered mobile communications apparatus 10 of FIG. 1 in monitoring battery power levels and reporting the monitored levels on the communications uplink. In steps 38 and 40, the battery power level monitoring circuit 26 measures the power level of the output operating voltage and processes the measured power level to identify the current charge state of the rechargeable battery 24. The charge state is processed by the battery power level monitoring circuit 26 in step 42 to determine whether a low battery condition exists. Such is generally the case if the measured power level has fallen below the given threshold. If so, a visual indication of a low battery level is provided to the user in step 44. The power level of the rechargeable battery 24, whether above or below the threshold, is then reported in step 46 by the battery power level monitoring circuit 26 to the central processing unit 28. A determination is then made in step 48 as to whether the mobile communications apparatus 10 is currently engaged in a call. If so (flow 50), and further on a periodic basis with respect thereto, the central processing unit 28 effectuates the transmission in step 52 on a communications uplink of certain information relating to the measured battery power level of the rechargeable battery 24. This information comprises, for example, battery level data (x volts), or a battery level indication (high, medium, low).

Figure 4:
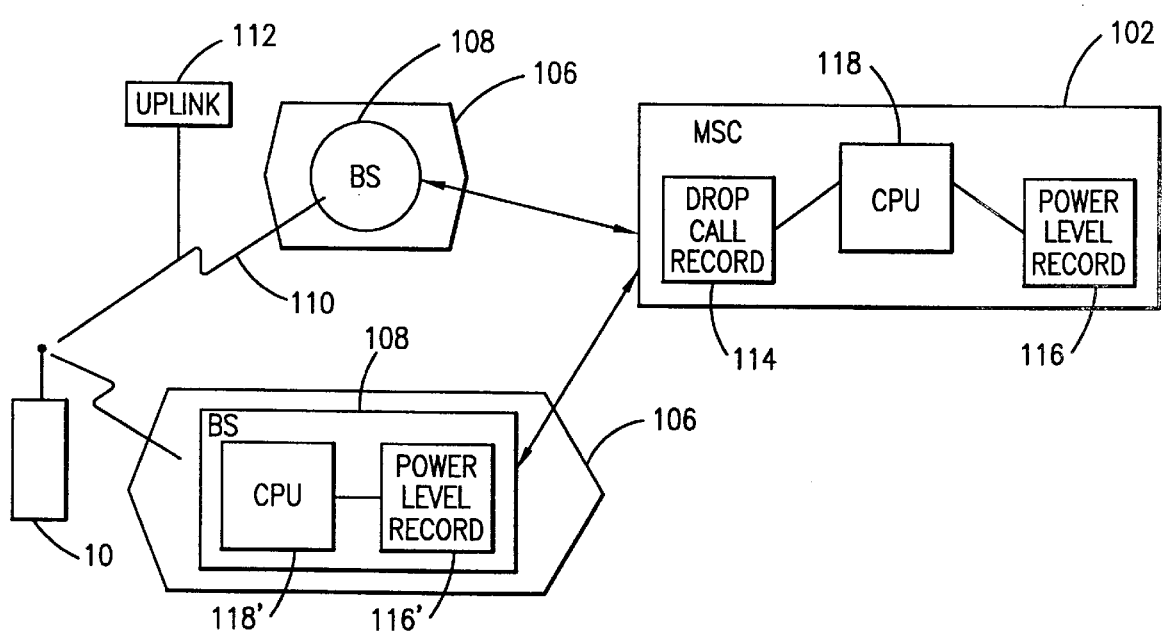
FIG. 4 is a block diagram of a mobile communications system wherein monitored battery power levels of the battery powered mobile communications apparatus are reported and analyzed in connection with the determination of a cause for call drops.

Reference is now additionally made to FIG. 4 wherein there is shown a block diagram of a mobile communications system 100 wherein monitored battery power levels of battery powered mobile communications apparatus 10 are reported and analyzed in connection with the determination of a cause for call drops. The communications system 100 includes a mobile switching center (MSC) 102 controlling the provision of cellular telephone service within a particular service area. Each service area includes a plurality of cells 106 (only two shown for simplification of the illustration), wherein each cell includes at least one base station (BS) 108 for effectuating radio frequency communications with proximately located mobile communications apparatus 10 over an air interface 110. The base stations 108 are connected for communications with the mobile switching center 102 for the service area within which the cells 106 for those base stations are located. The mobile communications system 100 may comprise a Global System for Mobile (GSM) communications, a digital Advanced Mobile Phone System (D-AMPS), a code division multiple access (CDMA) system, a Personal Communications Services (PCS) network, or the like. The general operation of the mobile communications system 100 like that shown in FIG. 4 to support mobile communications apparatus 10 voice and data communications services is well known to those skilled in the art, and will not be described in detail herein.

As previously discussed, the mobile communications apparatus 10 operates to monitor its battery power level and to report, on a periodic basis during the course of an ongoing call, the monitored battery level information. This report is made on an uplink communications channel 112 of the air interface 110. Any known uplink communications signal could be modified to include a parameter containing the battery level information (again comprising, for example, level data or level indication). Alternatively, an existing parameter in an existing signal could be reassigned to contain the information. Still further, a new signal message could be specified for communicating the information.

In a first embodiment, responsive to receipt of the uplink communicated battery power level information for the mobile communications apparatus 10, the base station 108 forwards the information on to the mobile switching center 102 for further processing when needed in connection with the determination of a cause for call drops. In particular, the mobile switching center 102 maintains a record 114 of instances of call drops. This record 114 further identifies, when known, a cause for each such call drop. With respect to each ongoing call, the mobile switching center 102 further maintains a record 116 of the uplink communicated battery power level information for the mobile communications apparatus 10 engaging in that call. To minimize the amount of data storage space needed for the record 116, and considering the number of mobile communications apparatus 10 for which the information needs to be stored, only the last five (for example) uplink communicated battery power data points are stored. In the event that the call is then inadvertently dropped, a processor (CPU) 118 reads the corresponding mobile communications apparatus 10 uplink communicated battery power level information from the record 116. This information is then evaluated by the processor 118 to determine whether failure of the battery for the mobile communications apparatus 10 is a likely cause of the call drop. If such a determination is made by the processor 118 from an analysis of the reported battery power level measurements, the processor notes in the record 114 (in association with the record of the call drop) that the cause of the call drop is mobile communications apparatus 10 battery failure.

In a second embodiment, the processor (CPU) 118' is maintained in the base station 108 along with the record 116' of the uplink communicated battery power level information for the mobile communications apparatus 10. Responsive to receipt of the uplink communicated battery power level information for the mobile communications apparatus 10, the base station 108 stores the uplink communicated battery power level information in the record 116'. To minimize the amount of data storage space needed for the record 116', and considering the number of mobile communications apparatus 10 for which the information needs to be stored, only the last five (for example) uplink communicated battery power data points are stored. In the event that the call is then inadvertently dropped, the processor (CPU) 118' reads the corresponding mobile communications apparatus 10 uplink communicated battery power level information from the record 116'. This information is then evaluated by the processor 118' to determine whether failure of the battery for the mobile communications apparatus 10 is a likely cause of the call drop. If such a determination is made by the processor 118' from an analysis of the reported battery power level measurements, the processor forwards this information on to the mobile switching center 102. The processor (CPU) 118 therein then notes in the record 114 (in association with the record of the call drop) that the cause of the call drop is mobile communications apparatus 10 battery failure.

Typically, if the mobile communications apparatus 10 uplink communicated battery power level information stored in the record 116 indicates that a number of reported battery power level measurements fall below the given threshold, the processor 118 infers, absent any other information to the contrary, that the cause of the call drop is mobile communications apparatus 10 battery failure. As a particular example, if three of the last five reported battery power level measurements stored in the record 116 fall below the given threshold, battery failure is assumed to be the cause of the call drop. Alternatively, as another particular example, if the last five reported battery power level measurements stored in the record 116 shown a continuing decrease in battery power level, with a measurement below the threshold, battery failure is assumed to be the cause of the call drop. Other battery power level measurement evaluation criteria, from which an inference of battery failure may be drawn, may of course be selected and implemented through appropriate programming of the processor 118. For example, indicator levels (low medium, high) could also be processed to determine battery failure. Thus, three or more consecutive "low" level reports could present an indication of battery failure.

Figure 5:
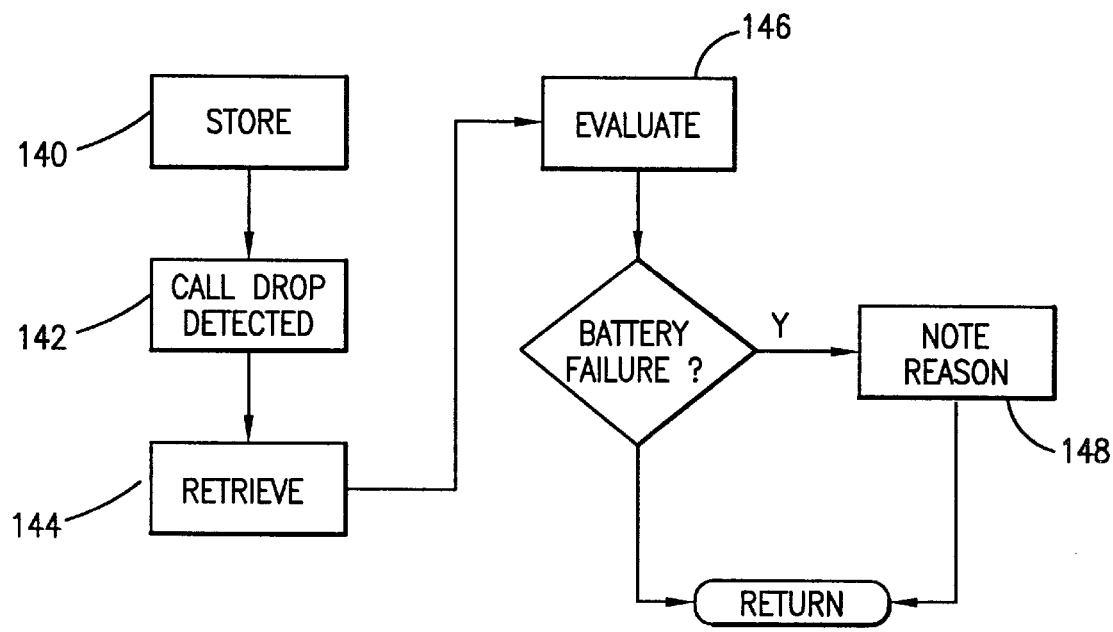
FIG. 5 is a flow diagram illustrating the operation of the mobile communications system of FIG. 4 in processing communications uplink reported battery power levels to identify battery failure as the cause of a call drop.

Reference is now additionally made to FIG. 5 wherein there is shown a flow diagram illustrating the operation of the mobile communications system 100 of FIG. 4 in processing communications uplink 112 reported battery power levels to identify battery failure as the cause of a call drop. The process performed by the mobile communications apparatus 10 in making and reporting battery power level measurements has been described previously in connection with FIG. 3, and thus will not be repeated herein. The received mobile communications apparatus 10 made and uplink transmitted battery power level measurements are stored in step 140 (in either the base station or mobile switching center). An instance of a call drop is then detected in step 142. Responsive thereto, the stored battery power level measurements are retrieved in step 144 (by either the base station or the mobile switching center). In step 146, the retrieved battery power level measurements are evaluated (by either the base station or the mobile switching center) to determine whether failure of the battery for the mobile communications apparatus 10 is a likely cause of the call drop. If such is the determination, a notation is made in step 148, in association with recording the instance of the call drop, that the cause of the call drop is mobile communications apparatus 10 battery failure.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for detecting a cause for a call drop in a mobile communications system, comprising the steps of:

receiving on an uplink communications link from a battery powered mobile communications apparatus signals indicative of monitored apparatus battery power levels;

storing the received battery power levels;

detecting an instance of a call drop with respect to that mobile communications apparatus;

retrieving the stored battery power levels;

processing the retrieved battery power levels to determine whether battery failure is a likely cause of the call drop; and responsive thereto, noting in association with a record of the call drop for that mobile communications apparatus the reason for the call drop being a battery failure.

2. The method as in claim 1 wherein the step of processing comprises the steps of:

comparing the retrieved power levels to a threshold; and identifying the reason for the call drop as being a battery failure if a majority of the power levels fall below the threshold.

3. The method as in claim 1 wherein the step of processing comprises the steps of:

comparing the retrieved power levels to a threshold;

determining whether the retrieved power levels indicate a decrease in power level; and identifying the reason for the call drop as being a battery failure if the power levels are determined to be decreasing and at least one power level falls below the threshold.

4. A mobile communications system, comprising:

means for receiving from a mobile communications apparatus signals indicative of monitored apparatus battery power levels;

a first memory for storing the received battery power levels;

means for detecting an instance of a call drop with respect to that mobile communications apparatus;

a second memory for storing a record of the call drop;

a processor responsive to the detection of the call drop for retrieving and processing the stored battery power levels to determine whether battery failure is a likely cause of the call drop, and responsive thereto for making a notation in the second memory in association with the record of the call drop the reason for the call drop being a battery failure.

5. The system as in claim 4 wherein the processing of the stored battery power levels compares the retrieved power levels to a threshold, and identifies the reason for the call drop as being a battery failure if a majority of the power levels fall below the threshold.

6. The system as in claim 4 wherein the processing of the stored battery power levels compares the retrieved power levels to a threshold, determines whether the retrieved power levels indicate a decrease in power level, and identifies the reason for the call drop as being a battery failure if the power levels are determined to be decreasing and at least one power level falls below the threshold.

* * * * *